US012638763B2

(12) United States Patent
Morikuni

(10) Patent No.: US 12,638,763 B2
(45) Date of Patent: May 26, 2026

(54) RELAY SYSTEM AND PROJECTOR

(71) Applicant: SEIKO EPSON CORPORATION,
Tokyo (JP)

(72) Inventor: Eiji Morikuni, Matsumoto (JP)

(73) Assignee: SEIKO EPSON CORPORATION,
Tokyo (JP)

( * ) Notice: Subject to any disclaimer, the term of this
patent is extended or adjusted under 35
U.S.C. 154(b) by 298 days.

(21) Appl. No.: 18/586,762

(22) Filed: Feb. 26, 2024

(65) Prior Publication Data

US 2024/0288762 A1 Aug. 29, 2024

(30) Foreign Application Priority Data

Feb. 27, 2023 (JP) ................................. 2023-028141

(51) Int. Cl.
*G03B 21/28* (2006.01)
*G02B 17/08* (2006.01)
(52) U.S. Cl.
CPC ............. *G03B 21/28* (2013.01); *G02B 17/08*
(2013.01)
(58) Field of Classification Search
CPC .. G03B 21/28; G03B 21/206; G03B 21/2013;
G03B 21/204; G03B 21/2073; G02B
17/08; H04N 9/3105
See application file for complete search history.

(56) References Cited

U.S. PATENT DOCUMENTS

| | | | | |
|---|---|---|---|---|
| 6,634,755 | B1 * | 10/2003 | Okuyama | .............. G03B 21/26 |
| | | | | 349/8 |
| 7,159,988 | B2 | 1/2007 | Yatsu et al. | |
| 2003/0133079 | A1 * | 7/2003 | Cobb | ................... H04N 9/3105 |
| | | | | 353/31 |
| 2003/0202159 | A1 * | 10/2003 | Cobb | ................... H04N 9/3164 |
| | | | | 353/31 |
| 2004/0156117 | A1 * | 8/2004 | Takaura | ............. G02B 17/0816 |
| | | | | 359/651 |

(Continued)

FOREIGN PATENT DOCUMENTS

| | | | |
|---|---|---|---|
| JP | 2005-157153 A | 6/2005 | |
| JP | 2005-345767 A | 12/2005 | |

(Continued)

*Primary Examiner* — Bao-Luan Q Le
(74) *Attorney, Agent, or Firm* — OLIFF PLC

(57) ABSTRACT
A relay system couples an enlargement-side image forma-
tion plane to a reduction-side image formation plane that is
a reduced enlargement-side image formation plane. The
relay system has a concave first reflection surface, a convex
second reflection surface, and a concave third reflection
surface sequentially arranged in the direction in which the
beams travel from the enlargement side toward the reduction
side. The optical axis of the enlargement-side image forma-
tion plane and the optical axis of the reduction-side image
formation plane are parallel to each other. The direction in
which the beams are incident on the enlargement-side image
formation plane is opposite the direction in which the beams
are incident on the reduction-side image formation plane.
The first and third reflection surfaces have different radii of
curvature. The first, second, and third reflection surfaces
each have an aspheric shape. Enlargement-side and reduc-
tion-side portions of the relay system are telecentric por-
tions.

11 Claims, 5 Drawing Sheets

(56)          References Cited

U.S. PATENT DOCUMENTS

| | | | | |
|---|---|---|---|---|
| 2014/0204351 A1* | 7/2014 | Matsuo | ................. | G02B 13/16 |
| | | | | 353/98 |
| 2017/0208300 A1* | 7/2017 | Toyooka | ............. | H04N 9/3167 |
| 2018/0059380 A1* | 3/2018 | Nagatoshi | ............. | G02B 13/16 |
| 2018/0307041 A1* | 10/2018 | Masui | ................... | G02B 13/16 |
| 2019/0129285 A1* | 5/2019 | Masui | ............... | G02B 13/0095 |
| 2019/0302601 A1* | 10/2019 | Nagatoshi | ............. | G03B 21/28 |
| 2020/0142291 A1* | 5/2020 | Nishikawa | ............. | G03B 21/28 |
| 2021/0055645 A1* | 2/2021 | Nishikawa | ......... | G03B 21/2066 |
| 2021/0063709 A1* | 3/2021 | Nagatoshi | ............. | G02B 13/22 |
| 2021/0063710 A1* | 3/2021 | Nagatoshi | ........... | G03B 21/147 |
| 2023/0074488 A1 | 3/2023 | Wakabayashi | | |
| 2023/0176463 A1* | 6/2023 | Nishiyama | ............. | G03B 21/28 |
| | | | | 353/99 |
| 2024/0073382 A1* | 2/2024 | Nagatoshi | ........... | H04N 9/3105 |
| 2024/0264519 A1* | 8/2024 | Nagatoshi | ............. | G03B 21/28 |
| 2024/0319484 A1* | 9/2024 | Morikuni | ............ | G02B 17/008 |
| 2025/0310495 A1* | 10/2025 | Morikuni | ............ | H04N 9/3152 |

FOREIGN PATENT DOCUMENTS

| | | | |
|---|---|---|---|
| JP | 2006-330410 A | 12/2006 |
| JP | 2022-038106 A | 3/2022 |
| JP | 2023-037782 A | 3/2023 |

* cited by examiner

RELAY SYSTEM AND PROJECTOR

The present application is based on, and claims priority from JP Application Serial Number 2023-028141, filed Feb. 27, 2023, the disclosure of which is hereby incorporated by reference herein in its entirety.

BACKGROUND

1. Technical Field

The present disclosure relates to a relay system and a projector.

2. Related Art

JP-A-2006-330410 describes an optical system that couples the enlargement-side image formation plane to the reduction-side image formation plane, which is a demagnified enlargement-side image formation plane. The first projection optical unit described in JP-A-2006-330410 is an optical system that includes telecentric portions at opposite sides and couples the primary image formation plane to the object plane, which is a reduced primary image formation plane. The first projection optical unit includes a first lens group having positive power, a second lens group having negative power, and a third lens group having positive power. The first lens group is formed of four lenses. The second lens group is formed of an aperture stop and five lenses. The third lens group is formed of three lenses.

JP-A-2006-330410 is an example of the related art.

The optical system described in JP-A-2006-330410 is formed of a large number of lenses, so that it is difficult to adjust the position of each of the lenses when the optical system is assembled. Therefore, in an optical system having telecentric portions at opposite sides and capable of change in magnification, a configuration having a smaller number of optical elements has been desired.

SUMMARY

To achieve the configuration described above, a relay system according to an aspect of the present disclosure is a relay system that couples an enlargement-side image formation plane to a reduction-side image formation plane that is a reduced version of the enlargement-side image formation plane, the relay system including a concave first reflection surface, a convex second reflection surface, and a concave third reflection surface sequentially arranged in a direction in which beams travel from an enlargement side toward a reduction side. An optical axis of the enlargement-side image formation plane and an optical axis of the reduction-side image formation plane are parallel to each other. A direction in which the beams are incident on the enlargement-side image formation plane is opposite a direction in which the beams are incident on the reduction-side image formation plane. The first and third reflection surfaces have different radii of curvature. The first, second, and third reflection surfaces each have an aspheric shape. Enlargement-side and reduction-side portions of the relay system are telecentric portions.

A projector according to another aspect of the present disclosure is a projector including the relay system described above, the projector including a light source, a color separation system that separates output light output from the light source into first color light having a first wavelength band containing blue light and other color light having a wavelength band longer than the first wavelength band and includes a first dichroic mirror that reflects the first color light in a direction perpendicular to an optical axis of the output light, a first light modulator that modulates the first color light separated by the first dichroic mirror, a second light modulator that modulates the other color light separated by the first dichroic mirror, a reflection mirror that reflects the first color light separated by the first dichroic mirror in a direction perpendicular a traveling direction of the first color light toward the first light modulator, the relay system, in which the first light modulator is disposed at the enlargement-side image formation plane and which reduces a luminous flux width of the first color light modulated by the first light modulator to a size of the reduction-side image formation plane, a light combining prism that combines the first color light the luminous flux width of which is reduced by the relay system and the other color light modulated by the second light modulator with each other into combined light and outputs the combined light, and a projection system that projects the combined light output from the light combining prism, an effective area of the first light modulator being larger than an effective area of the second light modulator.

DESCRIPTION OF EMBODIMENTS

A relay system and a projector according to embodiments of the present disclosure will be described below with reference to the drawings.

First Embodiment

Figure 1:
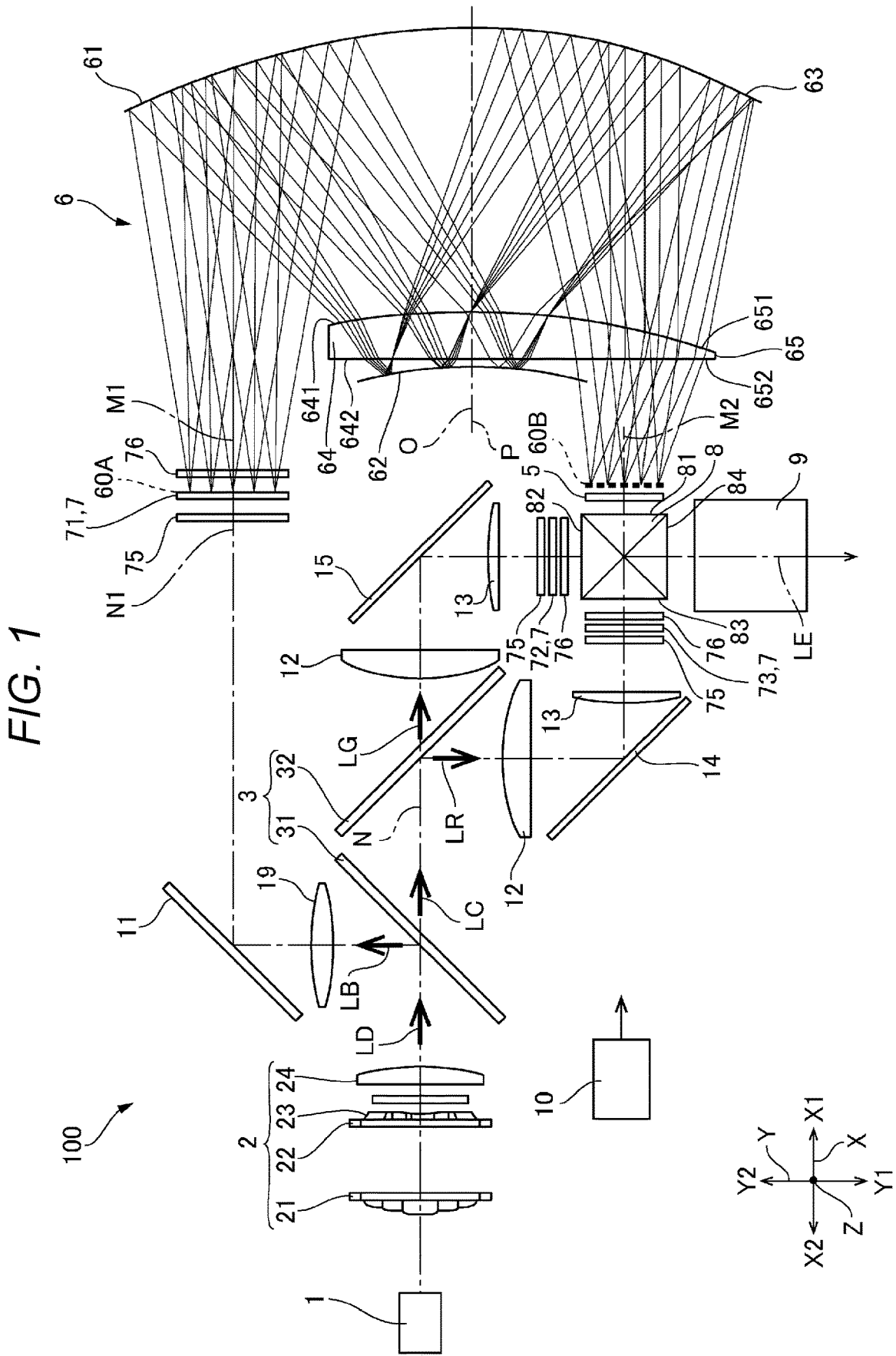
FIG. 1 is a schematic view of key parts of a projector using a relay system according to a first embodiment.

FIG. 1 is a schematic view of key parts of a projector 100 using a relay system 6 according to a first embodiment. The projector 100 includes a light source 1, an illumination system 2, which homogenizes the light output from the light source 1, a color separation system 3, which separates the light output from the illumination system 2 into a variety of types of color light, a plurality of light modulators 7, which modulate the plurality of types of color light separated by the color separation system 3 to form projection images, a reflection mirror 11, a relay system 6, which reduces the luminous flux width of the color light modulated by one of the plurality of light modulators 7, a light combining prism 8, which combines the plurality of types of color light modulated by the light modulators 7 with one another into combined light and outputs the combined light, a projection system 9, which projects the combined light output from the light combining prism 8, and a controller 10, which controls the light modulators 7, as shown in FIG. 1.

In the following description, three axes perpendicular to one another are called an X-axis, a Y-axis, and a Z-axis for convenience. The direction along a first optical axis N of the color separation system 3 is called an X-axis direction. In the X-axis direction, the direction in which the light output from the illumination system 2 travels is called a first direction X1, and the opposite direction of the first direction X1 is called a second direction X2. In the Y-axis direction, the direction in which the combined light exits out of the light combining prism 8 is called a third direction Y1, and the opposite direction of the third direction Y1 is called a fourth direction Y2.

The light source 1 is formed, for example, of an ultrahigh-pressure mercury lamp or a solid-state light source. In the present embodiment, the light source 1 outputs white light as output light LD.

The Illumination system 2 includes a multi-lens 21, a polarizing beam splitter 22, a multi-lens 23, and a relay lens 24. The multi-lens 21 divides the output light LD from the light source 1 into a plurality of luminous fluxes. The polarizing beam splitter 22 converts the polarization direction of the output light LD output from the multi-lens 21. The multi-lens 23 brings the output light LD output from the polarizing beam splitter 22 into focus in the vicinity of the relay lens 24. The relay lens 24 enlarges the output light LD incident from the multi-lens 23 and directs the enlarged output light LD toward the color separation system 3.

The color separation system 3 includes a first dichroic mirror 31 and a second dichroic mirror 32 sequentially arranged in the first direction X1. The first dichroic mirror 31 and the second dichroic mirror 32 are arranged along the first optical axis N of the color separation system 3. The optical axis of the output light LD from the illumination system 2 coincides with the first optical axis N.

The first dichroic mirror 31 separates the output light LD into first color light LB and other color light LC. The first dichroic mirror 31 reflects the first color light LB in the fourth direction Y2 and transmits the other color light LC in the first direction X1. The second dichroic mirror 32 separates the other color light LC into second color light LG and third color light LR. The second dichroic mirror 32 reflects the third color light LR in the third direction Y1 and transmits the second color light LG in the first direction X1. In the present embodiment, the first color light LB has a first wavelength band containing blue light. The second color light LG has a second wavelength band containing green light. The third color light LR has a third wavelength band containing red light. The first wavelength band ranges, for example, from 420 to 500 nm. The second wavelength band ranges, for example, from 500 to 600 nm. The third wavelength band ranges, for example, from 600 to 680 nm. The wavelength band of the other color light LC ranges, for example, from 500 to 680 nm.

A reflection mirror 14, which reflects in the first direction X1 the third color light LR separated by the second dichroic mirror 32, is disposed at a position shifted from the second dichroic mirror 32 in the third direction Y1. A reflection mirror 15, which reflects in the third direction Y1 the second color light LG separated by the second dichroic mirror 32, is disposed at a position shifted from the second dichroic mirror 32 in the first direction X1. A lens 12 is disposed between the second dichroic mirror 32 and the reflection mirror 14, and another lens 12 is disposed between the second dichroic mirror 32 and the reflection mirror 15. A lens 13 is disposed at a position shifted from the reflection mirror 14 in the first direction X1, and another lens 13 is disposed at a position shifted from the reflection mirror 15 in the third direction Y1. The lenses 12 and 13 bring the second color light LG and the third color light LR separated by the color separation system 3 into focus in the vicinity of the corresponding light modulators 7.

The reflection mirror 11 is disposed at a position shifted from the first dichroic mirror 31 in the fourth direction Y2. The reflection mirror 11 reflects in the first direction X1 the first color light LB separated by the first dichroic mirror 31. The projector 100 includes a relay lens 19 between the reflection mirror 11 and the first dichroic mirror 31. The relay lens 19 adjusts the position where the first color light LB from the first dichroic mirror 31 is brought into focus in such a way that the first light modulator 71 is uniformly irradiated with the first color light LB. In the present embodiment, the relay lens 19 is formed of a single lens. Note that the relay lens 19 may be formed of a plurality of lenses.

The light modulators 7 are each a liquid crystal panel. The light modulators 7 include the first light modulator 71, which modulates the first color light LB, a third light modulator 72, which modulates the second color light LG, and a fourth light modulator 73, which modulates the third color light LR. The first light modulator 71, the third light modulator 72, and the fourth light modulator 73 each include a light-incident-side polarizer 75 and a light-exiting-side polarizer 76. The third light modulator 72 and the fourth light modulator 73 correspond to the "second light modulator" in the present disclosure.

The first light modulator 71 is disposed at a position shifted from the first dichroic mirror 31 in the first direction X1. An optical axis N1 of the first light modulator 71 extends in the direction along the X-axis. The optical axis N1 of the first light modulator 71 is parallel to the first optical axis N of the color separation system 3.

The third light modulator 72 is disposed at a position where the third light modulator 72 faces a second surface 82 of the light combining prism 8. The fourth light modulator 73 is disposed at a position where the fourth light modulator 73 faces a third surface 83 of the light combining prism 8.

The effective area of the first light modulator 71 is larger than those of the third light modulator 72 and the fourth light modulator 73. The effective area used herein represents the area of the effective display region of each of the light modulators. In the present embodiment, the first light modulator 71 is a liquid crystal panel having an effective display region the diagonal dimension of which is 1.03 inches, and the third light modulator 72 and the fourth light modulator 73 are each a liquid crystal panel having an effective display region the diagonal dimension of which is 0.67 inches.

The relay system 6 couples an enlargement-side image formation plane 60A to a reduction-side image formation plane 60B, which is a reduced enlargement-side image formation plane 60A. The first light modulator 71 is disposed at the enlargement-side image formation plane 60A, and the relay system 6 reduces the luminous flux width of the first color light LB modulated by the first light modulator 71 to the size of the reduction-side image formation plane 60B. That is, the relay system 6 is a demagnifying optical system. In the present embodiment, the relay system 6 reduces the 1.03-inch luminous flux width of the first color light LB modulated by the first light modulator 71 to a 0.67-inch luminous flux width at the reduction-side image formation plane 60B. The optical axis N1 of the first light modulator 71 coincides with an optical axis M1 of the enlargement-side image formation plane 60A. The reduction-side image formation plane 60B is set at a position where the reduction-side image formation plane 60B faces a first surface 81 of the light combining prism 8. The air-equivalent distance between the reduction-side image formation plane 60B and the first surface 81 of the light combining prism 8 is equal to the air-equivalent distance between the third light modulator 72 and the second surface 82 of the light combining prism 8. The air-equivalent distance between the reduction-side image formation plane 60B and the first surface 81 of the light combining prism 8 is equal to the air-equivalent distance between the fourth light modulator 73 and the third surface 83 of the light combining prism 8.

The projector 100 includes a polarizer 5 disposed between the reduction-side image formation plane 60B and the first surface 81. The polarizer 5 and the polarizer 76 at the light exiting side of the first light modulator 71 transmit a component linearly polarized in a single direction out of the polarized light components contained in the first color light LB. That is, when the polarizer 76 at the light exiting side of the first light modulator 71 transmits the S-polarized light of the first color light LB, the polarizer 5 transmits the S-polarized light, and when the polarizer 76 at the light exiting side of the first light modulator 71 transmits the P-polarized light of the first color light LB, the polarizer 5 transmits the P-polarized light.

The light combining prism 8 has the first surface 81, on which the first color light LB is incident, the second surface 82, on which the second color light LG is incident, the third surface 83, on which the third color light LR is incident, and a fourth surface 84, via which combined light LE exits. The first surface 81 and the third surface 83 face each other in the X-axis direction. The second surface 82 and the fourth surface 84 face each other in the Y-axis direction. The light combining prism 8 combines the first color light LB the luminous flux width of which has been reduced by the relay system 6, the second color light LG modulated by the third light modulator 72, and the third color light LR modulated by the fourth light modulator 73 with one another into the combined light LE and outputs the combined light LE via the fourth surface 84 in the third direction Y1. The luminous flux width of the first color light LB incident on the first surface 81 of the light combining prism 8 is equal to those of the second color light LG incident on the second surface 82 of the light combining prism 8 and the third color light LR incident on the third surface 83 of the light combining prism 8.

The projection system 9 projects the combined light LE output from the light combining prism 8 onto a screen. The projection system 9 includes a plurality of lenses. The controller 10 operates the light modulators 7 based on an external image signal such as a video signal.

Details of Relay System

The relay system 6 has a concave first reflection surface 61, a convex second reflection surface 62, and a concave third reflection surface 63 sequentially arranged in the direction in which the beams travel from the enlargement side toward the reduction side, as shown in FIG. 1. The first reflection surface 61 and the third 63 reflection surface are integrated with each other. The radius of curvature of the first reflection surface 61 and the radius of curvature of the third reflection surface 63 differ from each other.

The first reflection surface 61, the second reflection surface 62, and the third reflection surface 63 each have an aspheric shape. The first reflection surface 61, the second reflection surface 62, and the third reflection surface 63 are each a rotationally symmetrical surface. The first reflection surface 61, the second reflection surface 62, and the third reflection surface 63 have a common design optical axis O. The design optical axis O extends in the X-axis direction.

The relay system 6 includes a first lens 64 disposed between the first reflection surface 61 and the second reflection surface 62 and between the second reflection surface 62 and the third reflection surface 63, and a second lens 65 disposed between the third reflection surface 63 and the reduction-side image formation plane 60B. The first lens 64 and the second lens 65 are integrated with each other. The first lens 64 and the second lens 65 have the same radius of curvature. More specifically, a lens surface 641 of the first lens 64, which is the surface facing in the first direction X1, and a lens surface 651 of the second lens 65, which is the surface facing in the first direction X1, have the same radius of curvature. Similarly, a lens surface 642 of the first lens 64, which is the surface facing in the second direction X2, and a lens surface 652 of the second lens 65, which is the surface facing in the second direction X2, have the same radius of curvature.

The lens surfaces 641 and 642 of the first lens are each a rotationally symmetrical surface. The lens surfaces 651 and 652 of the second lens are each a rotationally symmetrical surface. The lens surfaces 641 and 642 of the first lens and the lens surfaces 651 and 652 of the second lens have a common design optical axis P. The design optical axis P extends in the X-axis direction and coincides with the design optical axis O.

The first color light LB modulated by the first light modulator 71 travels in the first direction X1. The first color light LB having reached the first reflection surface 61 from the first light modulator 71 is reflected off the first reflection surface 61 in the second direction X2 and the third direction Y1. The first color light LB reflected off the first reflection surface 61 passes through the first lens 64 and reaches the second reflection surface 62. The first color light LB having reached the second reflection surface 62 is reflected off the second reflection surface 62 in the first direction X1 and the third direction Y1. The first color light LB reflected off the second reflection surface 62 passes through the first lens 64 and reaches the third reflection surface 63. The first color light LB having reached the third reflection surface 63 is reflected off the third reflection surface 63 in the second direction X2. The first color light LB reflected off the third reflection surface 63 passes through the second lens 65 and reaches the reduction-side image formation plane 60B.

The optical axis M1 of the enlargement-side image formation plane 60A and an optical axis M2 of the reduction-side image formation plane 60B are parallel to each other. The direction in which the first color light LB is incident on the enlargement-side image formation plane 60A is the first direction X1. The direction in which the first color light LB exits via the reduction-side image formation plane 60B is the second direction X2. That is, the direction in which the first color light LB is incident on the enlargement-side image formation plane 60A is opposite the direction in which the first color light LB exits via the reduction-side image formation plane 60B.

The enlargement-side image formation plane 60A and the reduction-side image formation plane 60B are located at positions shifted in the first direction X1 from the first surface 81 of the light combining prism 8 or at the same side thereof. That is, the first light modulator 71 and the reduction-side image formation plane 60B are located at positions shifted in the first direction X1 from the first surface 81 of the light combining prism 8 or at the same side thereof.

The enlargement-side and reduction-side portions of the relay system 6 are telecentric portions. The state in which the enlargement-side portion of the relay system 6 is a telecentric portion means that the central beam of each luminous flux traveling between the first reflection surface 61 and the enlargement-side image formation plane 60A is parallel or substantially parallel to the optical axis M1. The state in which the reduction-side portion of the relay system 6 is a telecentric portion means that the central beam of each luminous flux traveling between the second lens 65 and the reduction-side image formation plane 60B is parallel or substantially parallel to the optical axis M2. In the present embodiment, the angle between the central beam of each luminous flux and the optical axes M1 and M2 is smaller than or equal to +5°.

Data on the lenses of the relay system 6 are listed below. The surfaces of the lenses are numbered sequentially from the enlargement side toward the reduction side. Reference characters are given to the enlargement-side image formation plane, the first reflection surface, the first lens, the second reflection surface, the third reflection surface, the second lens, and the reduction-side image formation plane. A surface number preceded by "*" indicates that the surface of the lens is an aspheric surface. R represents the radius of curvature. D represents the axial inter-surface spacing. nd represents the refractive index. vd represents the Abbe number. Y represents the effective radius. R, D, and Y are each expressed in millimeters.

be reduced as compared with a case where the relay system is formed only of refractive lenses. Furthermore, in the present embodiment, since the relay system includes a small number of parts, the positions of the optical elements are readily adjusted when the relay system is assembled. The relay system 6 is incorporated in the projector 100 with less accuracy and is more readily positioned than in a case where the portions of the relay system 6 at opposite sides are not telecentric portions.

In the present embodiment, the optical axis M1 of the enlargement-side image formation plane 60A and the optical axis M2 of the reduction-side image formation plane 60B are parallel to each other. The direction in which the beams are incident on the enlargement-side image formation plane 60A is opposite the direction in which the beams are incident on the reduction-side image formation plane 60B. The relay system 6 can therefore efficiently deflect the optical path by 180° via the three reflection surfaces.

In the present embodiment, the first reflection surface 61 and the third reflection surface 63 have different radii of curvature. The first reflection surface 61, the second reflec-

| Reference character | Surface number | R | D | nd | vd | Mode | Y |
|---|---|---|---|---|---|---|---|
| 60A | 0 | 0.00000 | 115.00 | | | Refraction | 69.816 |
| 61 | 1 | −178.49209 | −70.00 | | | Reflection | 84.435 |
| 64 | 2 | −183.44420 | −11.50 | 1.458467 | 67.8 | Refraction | 32.295 |
| | 3 | −21694.45400 | −2.00 | | | Refraction | 26.681 |
| 62 | *4 | −117.32686 | 2.00 | | | Reflection | 27.000 |
| 64 | 5 | −21694.45400 | 11.50 | 1.458467 | 67.8 | Refraction | 19.000 |
| | 6 | −183.44420 | 70.00 | | | Refraction | 19.000 |
| 63 | *7 | −144.97227 | −70.00 | | | Reflection | 70.000 |
| 65 | 8 | −183.44420 | −11.50 | 1.458467 | 67.8 | Refraction | 57.957 |
| | 9 | −21694.45400 | −33.00 | | | Refraction | 58.000 |
| 60B | 10 | 0.00000 | 0.00 | | | Refraction | 45.735 |

| | Surface number | | |
|---|---|---|---|
| | 1 | 4 | 7 |
| Conic constant | 0 | 2.880608E+01 | 0 |
| Fourth-order coefficient | 3.919410E−08 | 2.088599E−06 | 1.337207E−08 |
| Sixth-order coefficient | 9.070897E−12 | 1.546748E−09 | −4.339381E−12 |
| Eighth-order coefficient | 1.242520E−15 | −1.224049E−12 | 8.161682E−16 |
| Tenth-order coefficient | −6.127942E−20 | 6.391380E−16 | −4.571229E−20 |

Effects and Advantages

The relay system 6 couples the enlargement-side image formation plane 60A to the reduction-side image formation plane 60B, which is a reduced enlargement-side image formation plane 60A. The relay system 6 has the concave first reflection surface 61, the convex second reflection surface 62, and the concave third reflection surface 63 sequentially arranged in the direction in which the beams travel from the enlargement side toward the reduction side. The relay system 6 includes the first lens 64 disposed between the first reflection surface 61 and the second reflection surface 62 and between the second reflection surface 62 and the third reflection surface 63, and the second lens 65 disposed between the third reflection surface 63 and the reduction-side image formation plane 60B. The enlargement-side and reduction-side portions of the relay system 6 are telecentric portions.

According to the present embodiment, the relay system 6 has the reflection surfaces, so that the number of parts can tion surface 62, and the third reflection surface 63 each have an aspheric shape. Since the first reflection surface 61 and the third reflection surface 63 have different radii of curvature, the opposite sides of the relay system 6 are readily made telecentric even when the relay system 6 is formed of a small number of optical parts. The three reflection surfaces each have an aspheric shape and can therefore satisfactorily correct a variety of aberrations produced in the relay system 6.

In the present embodiment, the first reflection surface 61, the second reflection surface 62, and the third reflection surface 63 are each aa rotationally symmetrical surface. Therefore, the reflection surfaces are readily processed, and the accuracy of the reflection surfaces is improved. Since the processing is readily performed, the manufacturing cost can be suppressed.

In the present embodiment, the first, second, and third reflection surfaces have the common design optical axis P. The reflection surfaces can thus be readily assembled and adjusted with respect to the design optical axis P of the reflection surfaces, so that the accuracy with which the reflection surfaces are assembled is improved.

In the present embodiment, the beams reflected off the first reflection surface 61 pass through the first lens 64 and reach the second reflection surface 62. The beams reflected off the second reflection surface 62 pass through the first lens and reach the third reflection surface. The beams reflected off the first reflection surface 61 can therefore be controlled by the first lens 64 in terms of the amount of divergence of the beams and the magnitude of the angle thereof, so that the axial inter-surface spacing between the first reflection surface 61 and the second reflection surface 62 can be reduced. Furthermore, the first lens 64 can satisfactorily correct the variety of aberrations that affect the beams reflected off the first reflection surface 61. Similarly, the beams reflected off the second reflection surface 62 can be controlled by the first lens 64 in terms of the amount of divergence of the beams and the magnitude of the angle thereof, so that the axial inter-surface spacing between the second reflection surface 62 and the third reflection surface 63 can be reduced. Furthermore, the first lens 64 can satisfactorily correct the variety of aberrations that affect the beams reflected off the second reflection surface 62.

In the present embodiment, the beams reflected off the third reflection surface 63 pass through the second lens 65 and reach the reduction-side image formation plane 60B. The beams reflected off the third reflection surface 63 can therefore be controlled by the second lens 65 in terms of the amount of divergence of the beams and the magnitude of the angle thereof, so that the axial inter-surface spacing between the third reflection surface 63 and the reduction-side image formation 60B plane can be reduced. Furthermore, the second lens 65 can satisfactorily correct the variety of aberrations that affect the beams reflected off the third reflection surface 63.

In the present embodiment, the first lens 64 and the second lens 65 are integrated with each other. The first lens 64 and the second lens 65 can thus be integrated with each other into a single lens, so that the number of parts can be reduced. In the present embodiment, the first lens 64 and the second lens 65 have the same radius of curvature. When the first lens 64 and the second lens 65 are thus integrated with each other into a single lens, the surfaces of the lenses are readily formed.

In the present embodiment, the first lens 64 and the second lens 65 each have a rotationally symmetrical lens surface. Therefore, the lens surfaces are readily processed, and the accuracy of the lens surfaces is improved. Since the processing is readily performed, the manufacturing cost can be suppressed.

In the present embodiment, the lens surfaces of the first lens 64 and the second lens 65 have the common design optical axes O. The design optical axis P of the lenses and the design optical axis O of the lens surfaces of the lenses coincide with each other. Since the reflection surfaces and the lenses have a common reference axis in accordance with which they are assembled, the reflection surfaces and the lenses are readily assembled and adjusted, so that the accuracy with which the reflection surfaces are assembled is improved.

The projector 100 according to the present embodiment includes the light source 1, the color separation system 3, which separates the output light LD output from the light source 1 into the first color light LB having the first wavelength band containing blue light and the other color light LC having a wavelength band longer than that of the first color light LB and includes the first dichroic mirror 31, which reflects the first color light in the Y-axis direction perpendicular to the optical axis of the output light LD, the first light modulator 71, which modulates the first color light LB separated by the first dichroic mirror 31, the second light modulator, which modulates the other color light LC separated by the first dichroic mirror 31, the reflection mirror 11, which reflects the first color light LB separated by the first dichroic mirror 31 in the X-axis direction, which is perpendicular to the traveling direction of the first color light LB, toward the first light modulator 71, the relay system 6, in which the first light modulator 71 is disposed at the enlargement-side image formation plane 60A and which reduces the luminous flux width of the first color light LB modulated by the first light modulator 71 to the size of the reduction-side image formation plane 60B, the light combining prism 8, which combines the first color light LB the luminous flux width of which has been reduced by the relay system 6 and the other color light LC modulated by the second light modulator with each other into the combined light LE and outputs the combined light LE, and the projection system 9, which projects the combined light LE output from the light combining prism 8. The effective area of the first light modulator 71 is larger than that of the second light modulator. The optical axis N1 of the first light modulator 71 is parallel to the optical axis M1 of the enlargement-side image formation plane 60A. The first light modulator 71 and the reduction-side image formation plane 60B are located at positions shifted in the first direction X1 from the first surface 81 of the light combining prism 8, which is the surface on which the first color light LB is incident, or at the same side of the first surface 81.

According to the present embodiment, the projector 100 uses the relay system 6 according to the present embodiment, so that the projector 100 provided by the present embodiment includes a small number of parts and is achieved at low cost.

According to the present embodiment, the effective area of the first light modulator 71 is larger than that of the second light modulator, so that the illuminance at the first light modulator 71 can be lower than that at the second light modulator. Degradation of the liquid crystal material of the first light modulator 71 due to the light from the light source 1 can thus be suppressed even when the luminance of the light from the light source 1 is increased.

The relay system 6 can reduce the luminous flux width of the first color light LB modulated by the first light modulator 71 to the size of the reduction-side image formation plane 60B and therefore allows the luminous flux widths of the variety of types of color light that enter the light combining prism 8 to be equal to one another even when the effective area of the first light modulator 71 is larger than that of the third light modulator 72.

The relay system 6, in which the first color light LB incident on the enlargement-side image formation plane 60A is deflected by 180° and exits via the reduction-side image formation plane 60B, allows reduction in overall size of the projector as compared with a case where the relay system 6 does not deflect the first color light LB.

Second Embodiment

Figure 2:
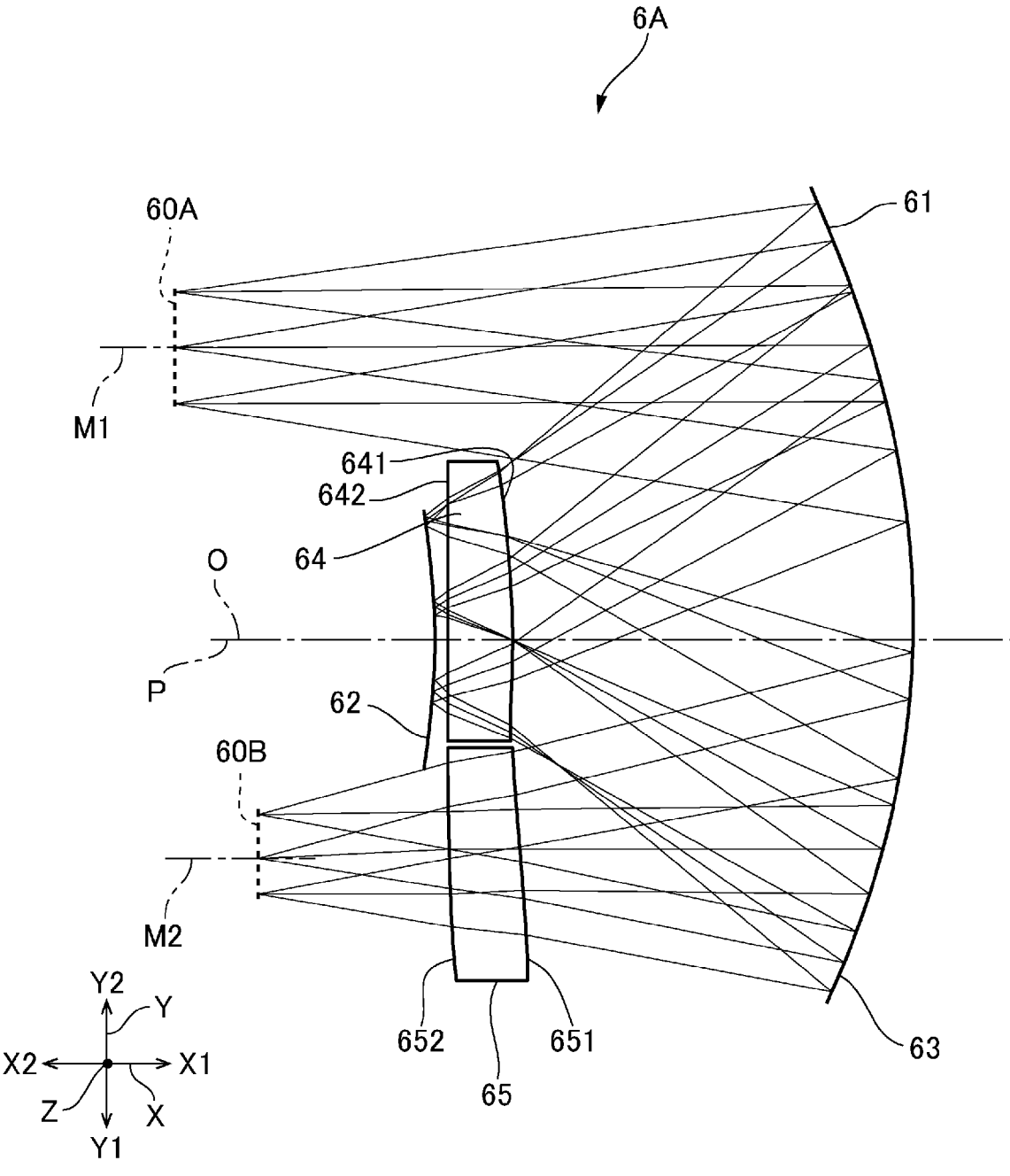
FIG. 2 is a schematic view of the relay system according to a second embodiment.

FIG. 2 is a schematic view of a relay system 6A according to a second embodiment. In the relay system 6A according to the second embodiment, the first lens 64 and the second lens 65 may be independent members, as shown in FIG. 2. Note that the relay system 6A according to the second embodiment can have a configuration that is the same as that of the relay system 6 according to the first embodiment except that the first lens 64 and the second lens 65 are independent members.

Third Embodiment

Figure 3:
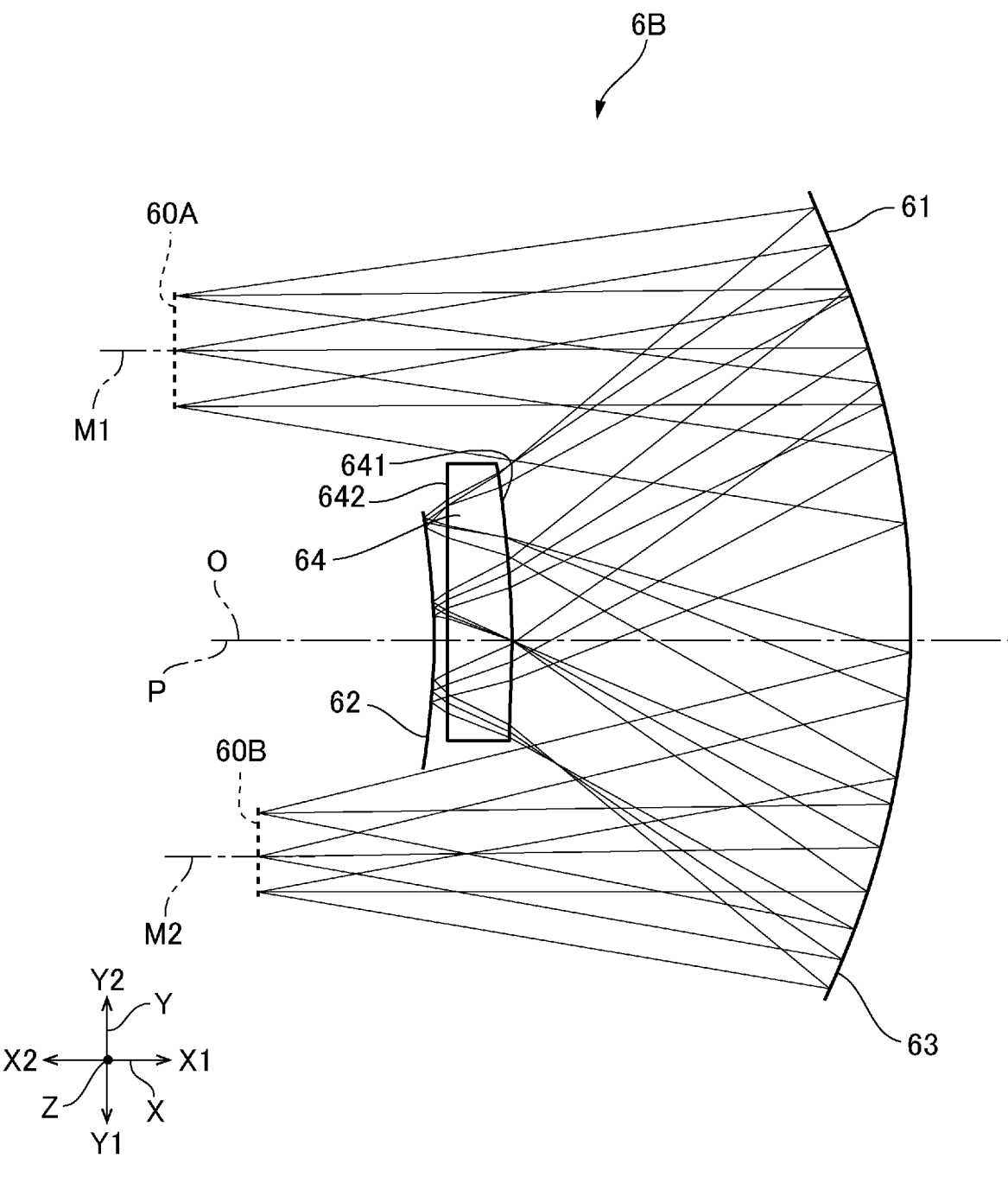
FIG. 3 is a schematic view of the relay system according to a third embodiment.

FIG. 3 is a schematic view of a relay system 6B according to a third embodiment. The relay system 6B according to the third embodiment may not include the second lens 65 and may only include the first lens 64, as shown in FIG. 3. Note that the relay system 6B according to the third embodiment can have a configuration that is the same as that of the relay system 6 according to the first embodiment except that the second lens 65 is not provided.

Fourth Embodiment

Figure 4:
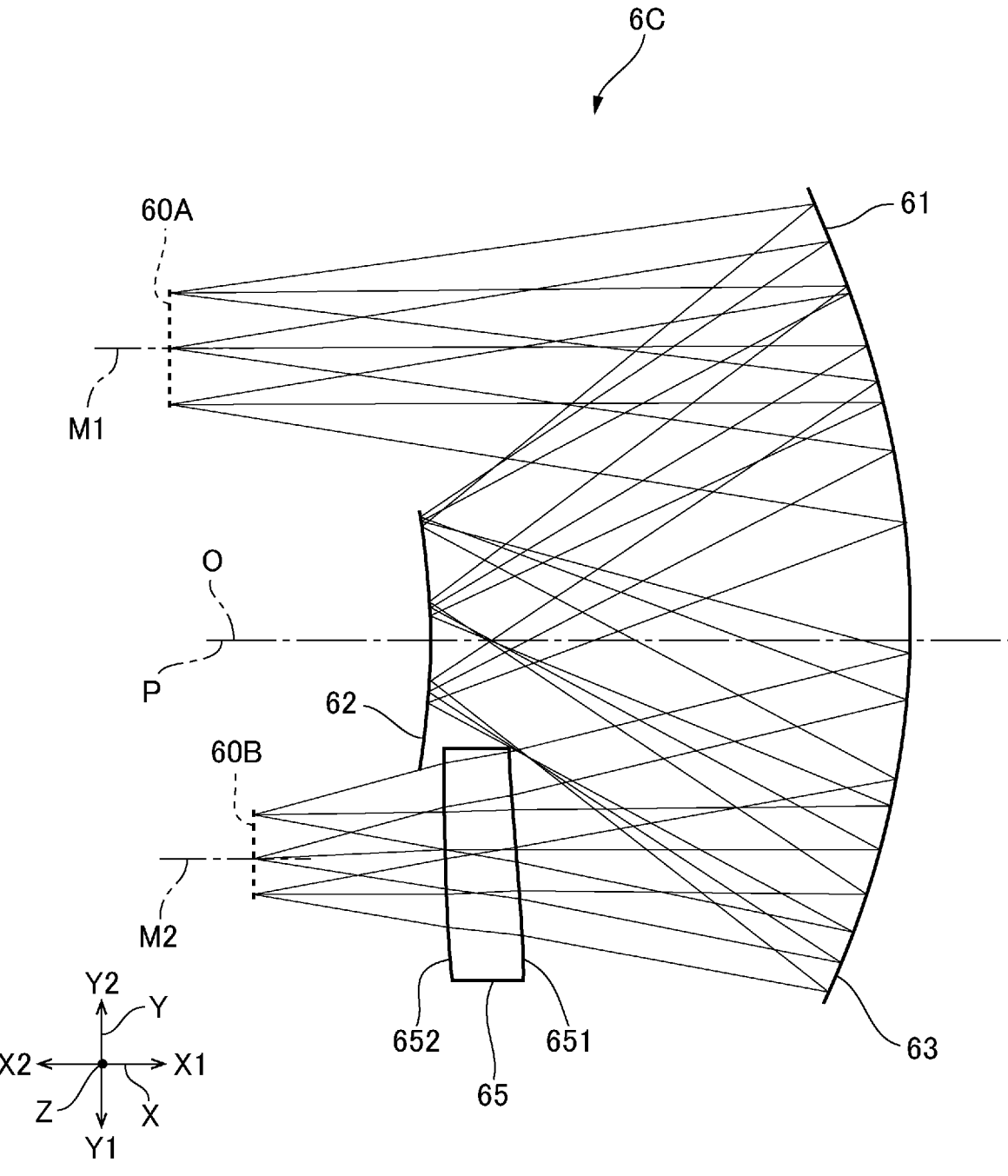
FIG. 4 is a schematic view of the relay system according to a fourth embodiment.

FIG. 4 is a schematic view of a relay system 6C according to a fourth embodiment. The relay system 6C according to the fourth embodiment may not include the first lens 64 and may only include the second lens 65, as shown in FIG. 4. Note that the relay system 6C according to the fourth embodiment can have a configuration that is the same as that of the relay system 6 according to the first embodiment except that the first lens 64 is not provided.

Fifth Embodiment

Figure 5:
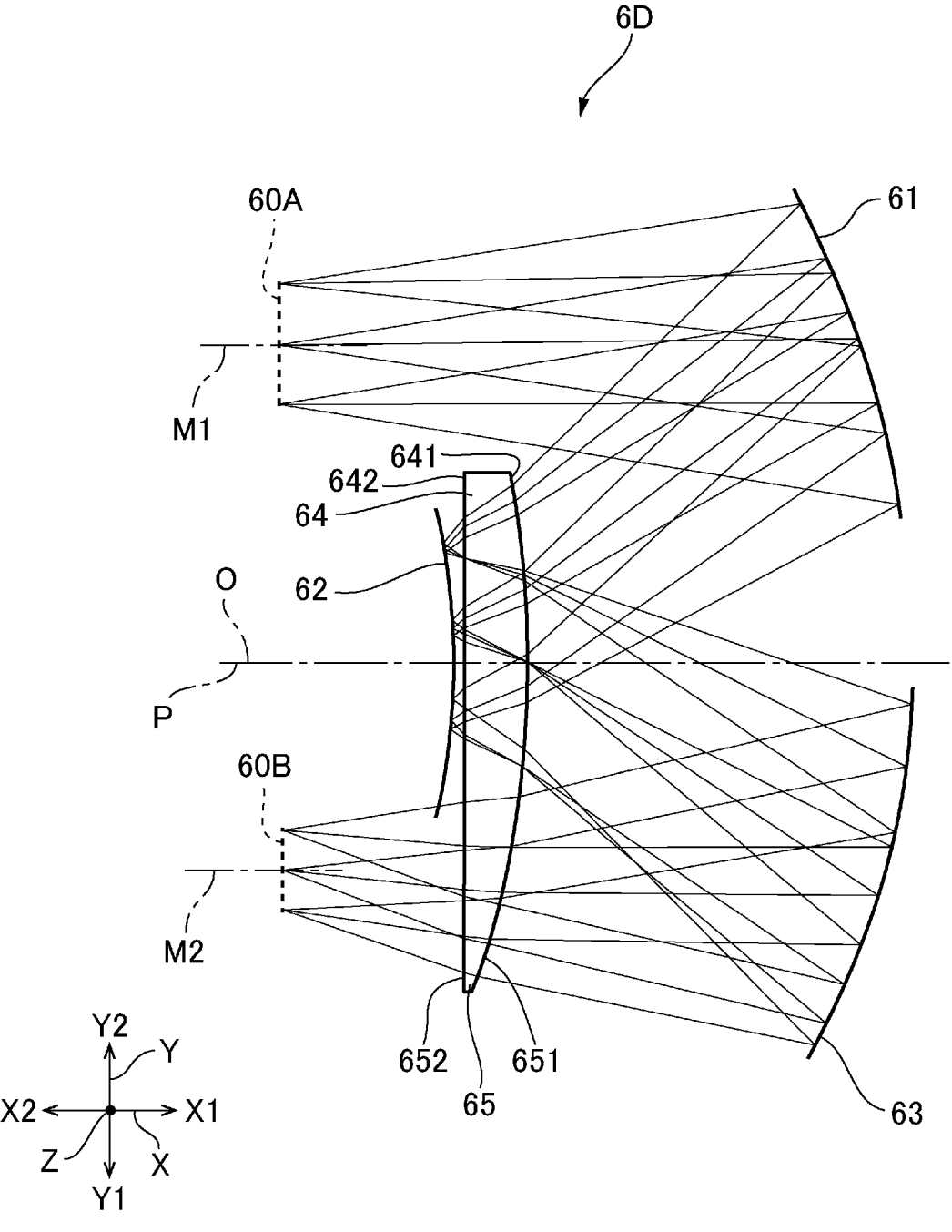
FIG. 5 is a schematic view of the relay system according to a fifth embodiment.

FIG. 5 is a schematic view of a relay system 6D according to a fifth embodiment. In the relay system 6D, the first reflection surface 61 and the third reflection surface 63 may be independent members, as shown in FIG. 5. Note that the relay system 6D according to the fifth embodiment can have a configuration that is the same as that of the relay system 6 according to the first embodiment except that the first reflection surface 61 and the third reflection surface 63 are independent members. The configuration in which the first reflection surface 61 and the third reflection surfaces 63 are independent members is applicable to the second to fourth embodiments.

OTHER EMBODIMENTS

In the embodiments described above, the lens surfaces of the first lens 64 may have aspheric shapes. The first lens 64 may instead have free-form surfaces. The thus configured first lens 64 can correct the variety of aberrations produced in the relay system 6.

In the embodiments described above, the lens surfaces of the second lens 65 may have aspheric shapes. The second lens 65 may have free-form surfaces. The thus configured second lens 65 can correct the variety of aberrations produced in the relay system 6.

The relay system 6 may include none of the first lens 64 and the second lens 65. That is, the relay system 6 may be formed only of the first reflection surface 61, the second reflection surface 62, and the third reflection surface 63.

The relay system 6 having the form described above is not necessarily used in a projector. The relay system 6 having the form described above can be used in apparatuses using optical an optical system that couples the enlargement-side image formation plane to the reduction-side image formation plane, which is a reduced enlargement-side image formation plane, such as exposure machines and steppers.

Summary of Present Disclosure

The present disclosure will be summarized below as additional remarks.

Additional Remark 1

A relay system that couples an enlargement-side image formation plane to a reduction-side image formation plane that is a reduced version of the enlargement-side image formation plane, the relay system having a concave first reflection surface, a convex second reflection surface, and a concave third reflection surface sequentially arranged in the direction in which the beams travel from the enlargement side toward the reduction side, the optical axis of the enlargement-side image formation plane and the optical axis of the reduction-side image formation plane being parallel to each other, the direction in which the beams are incident on the enlargement-side image formation plane being opposite the direction in which the beams are incident on the reduction-side image formation plane, the first and third reflection surfaces having different radii of curvature, the first, second, and third reflection surfaces each having an aspheric shape, and enlargement-side and reduction-side portions of the relay system being telecentric portions.

The relay system therefore has the reflection surfaces, so that the number of parts can be reduced as compared with the case where the relay system is formed only of refractive lenses. The relay system includes a small number of parts, so that the positions of the optical elements are readily adjusted when the relay system is assembled. Since the portions of the relay system at opposite sides are telecentric portions, the relay system is incorporated in the projector with less accuracy and more readily positioned than in the case where the portions of the relay system at opposite sides are not telecentric portions.

The relay system can efficiently deflect the optical path by 180° via the three reflection surfaces. The three reflection surfaces each have an aspheric shape and can therefore satisfactorily correct the variety of aberrations produced in the relay system.

Additional Remark 2

The relay system described in the additional remark 1, in which the first, second, and third reflection surfaces are each a rotationally symmetric surface.

Therefore, the reflection surfaces are readily processed, and the accuracy of the reflection surfaces is improved. Since the processing is readily performed, the manufacturing cost can be suppressed.

Additional Remark 3

The relay system described in the additional remark 2, in which the first, second, and third reflection surfaces have a common design optical axis.

The reflection surfaces can thus be readily assembled and adjusted with respect to the design optical axis of the reflection surfaces, so that the accuracy with which the reflection surfaces are assembled is improved.

Additional Remark 4

The relay system described in any one of the additional remarks 1 to 3, further including a first lens disposed between the first reflection surface and the second reflection surface and between the second reflection surface and the third reflection surface, the beams reflected off the first reflection surface passing through the first lens and reaching the second reflection surface, and the beams reflected off the second reflection surface passing through the first lens and reaching the third reflection surface.

The beams reflected off the first reflection surface can therefore be controlled by the first lens in terms of the amount of divergence of the beams and the magnitude of the angle thereof, so that the axial inter-surface spacing between the first reflection surface and the second reflection surface can be reduced. Furthermore, the first lens can satisfactorily correct the variety of aberrations that affect the beams reflected off the first reflection surface. Similarly, the beams reflected off the second reflection surface can be controlled by the first lens in terms of the amount of divergence of the beams and the magnitude of the angle thereof, so that the axial inter-surface spacing between the second reflection surface and the third reflection surface can be reduced. Furthermore, the first lens can satisfactorily correct the variety of aberrations that affect the beams reflected off the second reflection surface.

Additional Remark 5

The relay system described in any one of the additional remarks 1 to 3, further including a second lens disposed between the third reflection surface and the reduction-side image formation plane, the beams reflected off the third reflection surface passing through the second lens and reaching the reduction-side image formation plane.

The beams reflected off the third reflection surface can therefore be controlled by the second lens in terms of the amount of divergence of the beams and the magnitude of the angle thereof, so that the axial inter-surface spacing between the third reflection surface and the reduction-side image formation plane can be reduced. Furthermore, the second lens can satisfactorily correct the variety of aberrations that affect the beams reflected off the third reflection surface.

Additional Remark 6

The relay system described in any one of the additional remarks 1 to 3, further including a first lens disposed between the first reflection surface and the second reflection surface and between the second reflection surface and the third reflection surface, and a second lens disposed between the third reflection surface and the reduction-side image formation plane, the beams reflected off the first reflection surface passing through the first lens and reaching the second reflection surface, the beams reflected off the second reflection surface passing through the first lens and reaching the third reflection surface, and the beams reflected off the third reflection surface passing through the second lens and reaching the reduction-side image formation plane.

The beams reflected off the first reflection surface can therefore be controlled by the first lens in terms of the amount of divergence of the beams and the magnitude of the angle thereof, so that the axial inter-surface spacing between the first reflection surface and the second reflection surface can be reduced. Moreover, the first lens can satisfactorily correct the variety of aberrations that affect the beams reflected off the first reflection surface. Similarly, the beams reflected off the second reflection surface can be controlled by the first lens in terms of the amount of divergence of the beams and the magnitude of the angle thereof, so that the axial inter-surface spacing between the second reflection surface and the third reflection surface can be reduced. Moreover, the first lens can satisfactorily correct the variety of aberrations that affect the beams reflected off the second reflection surface. Furthermore, the beams reflected off the third reflection surface can be controlled by the second lens in terms of the amount of divergence of the beams and the magnitude of the angle thereof, so that the axial inter-surface spacing between the third reflection surface and the reduction-side image formation plane can be reduced. Moreover, the second lens can satisfactorily correct the variety of aberrations that affect the beams reflected off the third reflection surface.

Additional Remark 7

The relay system described in the additional remark 6, in which the first and second lenses are integrated with each other.

The first and second lenses can thus be integrated with each other into a single lens, so that the number of parts can be reduced.

Additional Remark 8

The relay system described in the additional remark 7, in which the first and second lenses have the same radius of curvature.

Therefore, when the first and second lenses are thus integrated with each other into a single lens, the surfaces of the lenses are readily formed.

Additional Remark 9

The relay system described in any one of the additional remarks 6 to 8, in which the first and second lenses each have rotationally symmetric lens surfaces.

Therefore, the lens surfaces are readily processed, and the accuracy of the lens surfaces is improved. Since the processing is readily performed, the manufacturing cost can be suppressed.

Additional Remark 10

The relay system described in the additional remark 9, in which the lens surface of the first lens and the lens surface of the second lens have a common design optical axis.

The lenses can thus be readily assembled and adjusted with respect to the design optical axis of the lens surfaces, so that the accuracy with which the lenses are assembled is improved.

Additional Remark 11

A projector including the relay system described in any one of the additional remarks 1 to 10, the projector including a light source, a color separation system that separates output light output from the light source into first color light having a first wavelength band containing blue light and other color light having a wavelength band longer than the first wavelength band and includes a first dichroic mirror that reflects the first color light in the direction perpendicular to the optical axis of the output light, a first light modulator that modulates the first color light separated by the first dichroic mirror, a second light modulator that modulates the other color light separated by the first dichroic mirror, a reflection mirror that reflects the first color light separated by the first dichroic mirror in the direction perpendicular the traveling direction of the first color light toward the first light modulator, the relay system, in which the first light modulator is disposed at the enlargement-side image formation plane and which reduces the luminous flux width of the first color light modulated by the first light modulator to the size of the reduction-side image formation plane, a light combining prism that combines the first color light the luminous flux width of which has been reduced by the relay system and the other color light modulated by the second light modulator with each other into combined light and outputs the combined light, and a projection system that projects the combined light output from the light combining prism, the effective area of the first light modulator is larger than the effective area of the second light modulator.

The thus configured projector has a smaller number of parts and is achieved at low cost.

What is claimed is:

1. A relay system that couples an enlargement-side image formation plane to a reduction-side image formation plane that is a reduced version of the enlargement-side image formation plane, the relay system comprising:

a concave first reflection surface; a convex second reflection surface; and a concave third reflection surface sequentially arranged in a direction in which beams travel from an enlargement side toward a reduction side, wherein an optical axis of the enlargement-side image formation plane and an optical axis of the reduction-side image formation plane are parallel to each other, a direction in which the beams are incident on the enlargement-side image formation plane is opposite a direction in which the beams are incident on the reduction-side image formation plane, the first and third reflection surfaces have different radii of curvature, the first, second, and third reflection surfaces each have an aspheric shape, and enlargement-side and reduction-side portions of the relay system are telecentric portions.

2. The relay system according to claim 1, wherein the first, second, and third reflection surfaces are each a rotationally symmetric surface.

3. The relay system according to claim 2, wherein the first, second, and third reflection surfaces have a common design optical axis.

4. The relay system according to claim 1, further comprising a first lens disposed between the first reflection surface and the second reflection surface and between the second reflection surface and the third reflection surface, wherein the beams reflected off the first reflection surface pass through the first lens and reach the second reflection surface, and the beams reflected off the second reflection surface pass through the first lens and reach the third reflection surface.

5. The relay system according to claim 1, further comprising a second lens disposed between the third reflection surface and the reduction-side image formation plane, wherein the beams reflected off the third reflection surface pass through the second lens and reach the reduction-side image formation plane.

6. The relay system according to claim 1, further comprising:

a first lens disposed between the first reflection surface and the second reflection surface and between the second reflection surface and the third reflection surface; and a second lens disposed between the third reflection surface and the reduction-side image formation plane, wherein the beams reflected off the first reflection surface pass through the first lens and reach the second reflection surface, the beams reflected off the second reflection surface pass through the first lens and reach the third reflection surface, and the beams reflected off the third reflection surface pass through the second lens and reach the reduction-side image formation plane.

7. The relay system according to claim 6, wherein the first and second lenses are integrated with each other.

8. The relay system according to claim 7, wherein the first and second lenses have the same radius of curvature.

9. The relay system according to claim 6, wherein the first and second lenses each have rotationally symmetric lens surfaces.

10. The relay system according to claim 9, wherein the lens surface of the first lens and the lens surface of the second lens have a common design optical axis.

11. A projector including the relay system according to claim 1, the projector comprising:

a light source;

a color separation system that separates output light output from the light source into first color light having a first wavelength band containing blue light and other color light having a wavelength band longer than the first wavelength band and includes a first dichroic mirror that reflects the first color light in a direction perpendicular to an optical axis of the output light;

a first light modulator that modulates the first color light separated by the first dichroic mirror;

a second light modulator that modulates the other color light separated by the first dichroic mirror;

a reflection mirror that reflects the first color light separated by the first dichroic mirror in a direction perpendicular to a traveling direction of the first color light toward the first light modulator;

the relay system, in which the first light modulator is disposed at the enlargement-side image formation plane and which reduces a luminous flux width of the first color light modulated by the first light modulator to a size of the reduction-side image formation plane;

a light combining prism that combines the first color light the luminous flux width of which is reduced by the relay system and the other color light modulated by the second light modulator with each other into combined light and outputs the combined light; and a projection system that projects the combined light output from the light combining prism, wherein an effective area of the first light modulator is larger than an effective area of the second light modulator.

\* \* \* \* \*